United States Patent
Hoshi et al.

(10) Patent No.: US 9,057,331 B2
(45) Date of Patent: Jun. 16, 2015

(54) CONTROL DEVICE FOR INTERNAL COMBUSTION ENGINE

(75) Inventors: Koichi Hoshi, Susono (JP); Takashi Watanabe, Gotemba (JP); Yoshihisa Shinoda, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 457 days.

(21) Appl. No.: 13/498,494

(22) PCT Filed: Mar. 12, 2010

(86) PCT No.: PCT/JP2010/054233
§ 371 (c)(1),
(2), (4) Date: Mar. 27, 2012

(87) PCT Pub. No.: WO2011/111224
PCT Pub. Date: Sep. 15, 2011

(65) Prior Publication Data
US 2012/0324870 A1  Dec. 27, 2012

(51) Int. Cl.
| | | |
|---|---|---|
| *F01N 3/00* | (2006.01) | |
| *F02D 19/06* | (2006.01) | |
| *F02D 41/00* | (2006.01) | |
| *F02D 41/02* | (2006.01) | |
| *F02M 43/04* | (2006.01) | |
| *F02D 19/08* | (2006.01) | |

(52) U.S. Cl.
CPC .......... *F02D 19/061* (2013.01); *F02D 19/0647* (2013.01); *F02D 41/0027* (2013.01); *F02D 41/0235* (2013.01); *F02D 2041/0265* (2013.01); *F02D 2200/0802* (2013.01); *F02M 43/04* (2013.01); *Y02T 10/36* (2013.01); *F02D 19/0615* (2013.01); *F02D 19/0692* (2013.01); *F02D 19/081* (2013.01)

(58) Field of Classification Search
CPC ............ F02D 19/0647; F02D 41/0027; F02D 41/0235; F02D 19/061; F02D 19/0615; F02D 19/0692; F02D 2041/0265; F02D 2200/0802; F02D 19/081
USPC ........ 60/285; 123/27 GE, 525, 526, 299, 300, 123/304, 478, 480, 575; 701/103
See application file for complete search history.

(56) References Cited

U.S. PATENT DOCUMENTS

| | | | |
|---|---|---|---|
| 6,742,335 B2 * | 6/2004 | Beck et al. ................. | 60/605.2 |
| 2004/0093855 A1 * | 5/2004 | Monro, Jr. ................... | 60/286 |

(Continued)

FOREIGN PATENT DOCUMENTS

| | | |
|---|---|---|
| JP | 6-221193 A | 8/1994 |
| JP | 2002-332890 A | 11/2002 |
| JP | 2003-065027 A | 3/2003 |
| JP | 2006-112291 A | 4/2006 |

(Continued)

OTHER PUBLICATIONS

International Search Report for PCT/JP2010/054233 dated Jun. 1, 2010.

*Primary Examiner* — Jason Shanske
(74) *Attorney, Agent, or Firm* — Sughrue Mion, PLLC

(57) ABSTRACT

A control device for an internal combustion engine is mounted on a vehicle, and includes an engine, a catalyst and a control unit. The engine is a bifuel engine using gas fuel and liquid fuel as its fuel source. The control unit makes an air fuel ratio rich and increases a proportion of the gas fuel if a temperature of the catalyst is higher than a predetermined upper limit value at a time when the liquid fuel is used.

2 Claims, 5 Drawing Sheets

(56) References Cited

U.S. PATENT DOCUMENTS

2005/0223699 A1* 10/2005 Ancimer et al. ............... 60/286
2007/0119169 A1*  5/2007 Berger et al. .................. 60/600
2009/0223206 A1*  9/2009 Peters et al. ................... 60/285
2009/0293452 A1* 12/2009 Tarabulski ..................... 60/276

FOREIGN PATENT DOCUMENTS

| JP | 2008-2431 A | 1/2008 |
| JP | 2008-133726 A | 6/2008 |
| JP | 2008-169704 A | 7/2008 |
| JP | 2009-257248 A | 11/2009 |

* cited by examiner

FIG. 1
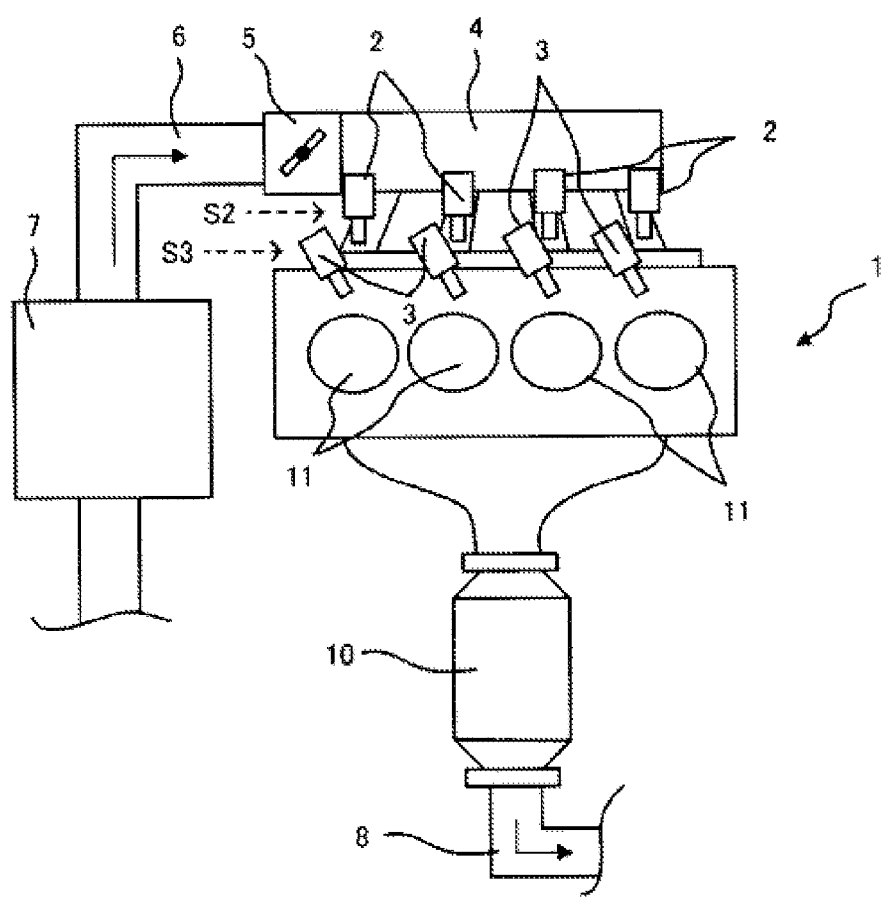
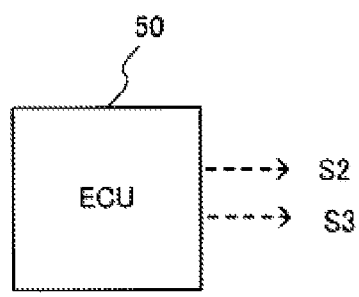

CONTROL DEVICE FOR INTERNAL COMBUSTION ENGINE

CROSS REFERENCE TO RELATED APPLICATIONS

This application is a National Stage of International Application No. PCT/JP2010/054233 filed Mar. 12, 2010, the contents of which are incorporated herein by reference in their entirety.

TECHNICAL FIELD

The present invention relates to control of a vehicle including an internal combustion engine (an engine).

BACKGROUND TECHNIQUE

Conventionally, there is known a technique which lowers an exhaust gas temperature by increasing fuel injection quantity in case of a high temperature of a catalyst. For example, in Patent Reference-1, as for fuel which includes alcohol, there is described a technique which increases a proportion of alcohol fuel at the time when a catalyst temperature is equal to or higher than an upper limit temperature. In this case, the catalyst temperature is lowered and the deterioration of the catalyst is suppressed because of the evaporative heat and the difference of the combustion temperature. In Patent Reference-2, there is described a technique which changes the temperature setting of the fuel cut based on a proportion of oxygenated fuel to the used fuel in order to prevent the exhaust system temperature from excessively increasing.

Patent Reference-1: Japanese Patent Application Laid-open under No. 2008-133726
Patent Reference-2: Japanese Patent Application Laid-open under No. 2009-257248

DISCLOSURE OF INVENTION

Problem to be Solved by the Invention

When the fuel injection quantity of the liquid fuel is increased, the amount of fuel adhering to the intake port and/or the combustion chamber becomes large. Therefore, after that time, when the fuel cut is executed in response to the deceleration, the unburned fuel flows into the exhaust system thereby to prompt the oxidation reaction in the catalyst by the unburned fuel and a large amount of oxygen. As a result, there is a possibility that the catalyst temperature increases and the deterioration of the catalyst becomes advanced.

The present invention has been achieved in order to solve the above problem. It is an object of this invention to provide a control device for an internal combustion engine capable of lowering a catalyst temperature and suppressing deterioration of the catalyst.

Means for Solving the Problem

According to one aspect of the present invention, there is provided a control device for an internal combustion engine, including: an engine which is capable of using gas fuel and liquid fuel as its fuel source; a catalyst which cleans up exhaust gas of the engine; and a control unit which makes an air fuel ratio rich and increases a proportion of the gas fuel if a temperature of the catalyst is higher than a predetermined upper limit value at a time when the liquid fuel is used.

The above control device for an internal combustion engine is mounted on a vehicle, and includes an engine, a catalyst and a control unit. The engine is a bifuel engine using gas fuel and liquid fuel as its fuel source. The control unit is an ECU (Electronic Control Unit) for example, and it makes an air fuel ratio rich and increases a proportion of the gas fuel if a temperature of the catalyst is higher than a predetermined upper limit value at a time when the liquid fuel is used. The term "proportion of the gas fuel" herein indicates a proportion that the gas fuel is used as the fuel source. The term "make an air fuel ratio rich" herein indicates changing the air fuel ratio toward the rich side. As described above, the control device for an internal combustion engine makes the air fuel ratio rich and increases the proportion of the gas fuel, in case of lowering the catalyst temperature for the sake of preventing the deterioration because the catalyst temperature becomes high. Thereby, the control device for an internal combustion engine prevents the unburned fuel from excessively adhering to the intake port and/or the cylinders, and it can suppress the deterioration of the catalyst and the rise of the catalyst temperature at the time of the fuel cut. By increasing the use proportion of the gas fuel whose volume is larger than the volume of the liquid fuel on condition of the same mass, the control device for an internal combustion engine can also lower the intake air amount of the combustion chamber and the packing efficiency thereby to lower the catalyst temperature. The control device for an internal combustion engine can also realize the low emission by increasing the proportion of the gas fuel while the consumption of the fuel is increased.

In a manner of the control device for an internal combustion engine, the control unit sets a timing of returning the proportion to its original value to a timing of a return from fuel cut, after the control unit makes the air fuel ratio rich and increases the proportion of the gas fuel. In this way, by setting a timing of returning the proportion to its original value to a timing of a return from fuel cut, the control device for an internal combustion engine can scavenge the inside of the combustion chamber at the time of the fuel cut. Therefore, the control device for an internal combustion engine can avoid the influence caused by increasing the proportion of the gas fuel when it starts the former control of the fuel injection again.

In another manner of the control device for an internal combustion engine, the control unit executes a control of making the air fuel ratio rich and increasing the proportion of the gas fuel at a time of acceleration and/or at a time of shifting gears of a transmission. Thereby, the control device for an internal combustion engine prevents the unburned fuel from excessively adhering to the intake port and/or the cylinders at a time of acceleration and/or at a time of shifting gears of a transmission, and it can suppress the deterioration of the catalyst and the rise of the catalyst temperature at the time of the fuel cut. The control device for an internal combustion engine can also lower the intake air amount of the combustion chamber and the packing efficiency thereby to lower the catalyst temperature. The control device for an internal combustion engine can also realize the low emission by increasing the proportion of the gas fuel while the consumption of the fuel is increased.

BRIEF DESCRIPTION OF THE DRAWINGS

FIG. 1 is an example of a fuel injection system to which the control device for an internal combustion engine according to the present invention is applied.

DETAILED DESCRIPTION OF THE PREFERRED EMBODIMENTS

Figure 2:
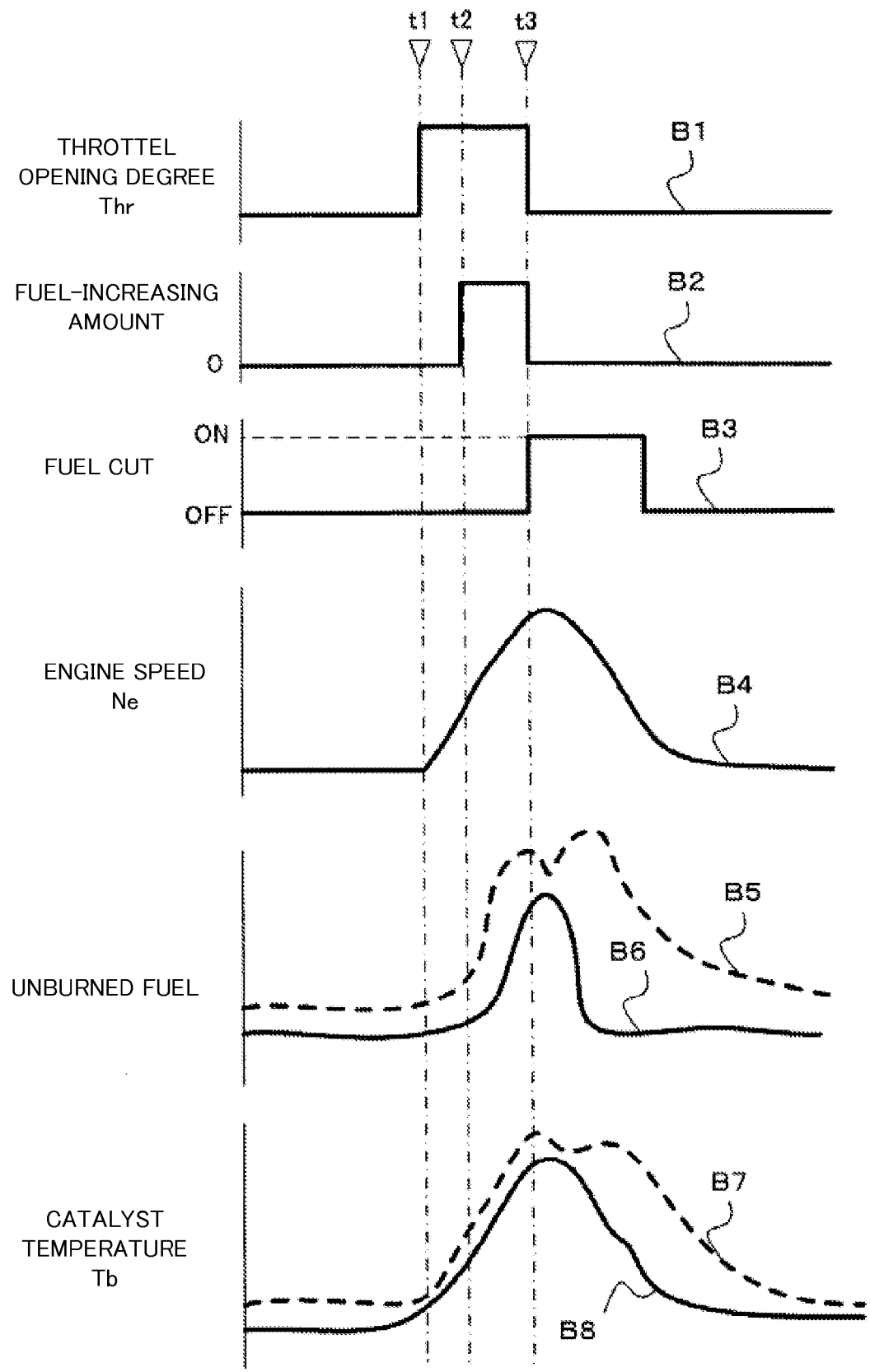
FIG. 2 is an example of a time chart for explaining the behavior of the catalyst temperature at the time of the liquid fuel operation and at the time of the gas fuel operation.

A preferred embodiment of the present invention will be explained hereinafter with reference to the drawings.

[Schematic Configuration of Internal Combustion Engine]

FIG. 1 shows the fuel injection system 100 to which the control device for an internal combustion engine according to the present invention is applied. The solid arrows show examples of flows of gas in the figure.

The fuel injection system 100 mainly includes an engine 1, first fuel injection valves 2, second fuel injection valves 3, a surge tank 4, a throttle valve 5, an intake passage 6, an air cleaner 7, an exhaust passage 8, and a catalyst 10.

The engine 1 includes four cylinders 11, and each of the cylinders 11 is connected to the common surge tank 4 via an intake manifold. On each of the cylinders 11, there are provided a first fuel injection valve 2 for injecting gas fuel and a second fuel injection valve 3 for injecting liquid fuel, respectively. Here, the gas fuel may be CNG (Compressed Natural Gas), LPG (Liquefied Petroleum Gas) or LNG (Liquefied Natural Gas), for example. The liquid fuel may be gasoline, light oil, alcohol such as methanol and ethanol, and mixed fuel of them, for example.

The surge tank 4 is connected to the air cleaner 7 via the intake passage 6, and the throttle valve 5 is arranged in the intake passage 6. The opening degree (hereinafter referred to as "throttle opening degree Thr") of the above-mentioned throttle valve 5 is controlled by the control signal supplied from the ECU 50. Each of the cylinders 11 is connected to the exhaust passage 8 via the common exhaust manifold. On the exhaust passage 8, there is provided the catalyst 10 which is a three-way catalyst.

The ECU 50 includes a CPU (Central Processing Unit), a ROM (Read Only Memory) and a RAM (Random Access Memory) which are not shown, and executes various control of each component in the fuel injection system 100. For example, the ECU 50 executes the control over the first fuel injection valves 2 and the second fuel injection valves 3 on the basis of the detection signals supplied from various sensors. The ECU 50 also executes the control of lowering the temperature (hereinafter referred to as "catalyst temperature Tb") of the catalyst 10 when it determines that the temperature of the catalyst 10 is high in case of a predetermined operating state. The ECU 50 functions as a control unit in the present invention.

[Control Method]

Next, a concrete description will be given of the control executed by the ECU 50. By executing the following first control to the third control described below, the ECU 50 lowers the catalyst temperature Tb and suppresses the deterioration of the catalyst 10.

The term "gas fuel operation" herein indicates an operation in which the fuel injection by the first fuel injection valve 2 is executed, i.e., an operation in which the gas fuel is used, and the term "liquid fuel operation" herein indicates an operation in which the fuel injection by the second fuel injection valve 3 is executed, i.e., an operation in which the liquid fuel is used. The term "fuel cut" herein indicates stopping the fuel injection with respect to a part of or all the cylinders 11. Besides, the term "return from the fuel cut" herein indicates restarting the fuel injection from a state of the fuel cut.

(First Control)

Summarily, in the first control, the ECU 50 executes increase of the fuel injection quantity (hereinafter referred to as "fuel increasing") and switches to the gas fuel operation, when the catalyst temperature Tb becomes higher than a predetermined upper limit temperature at an operating range where the liquid fuel operation is executed. Thereby, the ECU 50 suppresses the deterioration of the catalyst 10 and lowers the catalyst temperature Tb.

The concrete description thereof will be given below. First, the ECU 50 determines whether or not the catalyst temperature Tb is higher than a predetermined upper limit temperature (hereinafter referred to as "upper limit temperature Tbth") while it executes the liquid fuel operation. The upper limit temperature Tbth is set by experimental trials to an upper limit value of the catalyst temperature Tb at which the deterioration of the catalyst 10 is not likely to occur, for example.

Concretely, the ECU 50 estimates the catalyst temperature Tb based on the load of the engine 1 and the rotational speed of the engine 1, for example. Then, the ECU 50 determines that the catalyst temperature Tb is higher than the upper limit temperature Tbth when the engine 1 is at a predetermined operating range where the load and the rotational speed are high. In another example, the ECU 50 measures the exhaust gas temperature based on a temperature sensor provided on the exhaust passage 8 which is not shown. Then, the ECU 50 estimates the catalyst temperature Tb from the above-mentioned exhaust gas temperature, and compares it to the upper limit temperature Tbth. In still another example, the ECU 50 detects the catalyst temperature Tb based on a temperature sensor not shown and provided on the catalyst 10, and compares it to the upper limit temperature Tbth.

When the catalyst temperature Tb is higher than the upper limit temperature Tbth, the ECU 50 executes the fuel increasing to make the air fuel ratio rich, and switches from the liquid fuel operation to the gas fuel operation. Thereby, as a first effect of the first control, the ECU 50 can suppress the rise of the catalyst temperature Tb and the deterioration of the catalyst 10 due to the adhesion of the fuel to the intake port and/or the insides of the cylinders 11 at the time of the fuel cut. Besides, as a second effect of the first control, the ECU 50 can effectively lower the catalyst temperature Tb by switching from the liquid fuel operation to the gas fuel operation at the time of the fuel increasing. In other words, by switching to the gas fuel whose volume is larger than the volume of the liquid fuel on condition of the same mass, the ECU 50 can lower the packing efficiency and the intake air amount thereby to lower the exhaust gas temperature. Generally, in case of an air fuel ratio richer than the theoretical air fuel ratio, the emission of the gas fuel is lower than the emission of the liquid fuel. Therefore, the ECU 50 can realize the low emission as a third effect of the first control by executing the gas fuel operation at the time of the fuel increasing.

Further, explanations will be given of the above-mentioned effects with reference to FIG. 2. FIG. 2 is an example of a time chart for explaining the behavior of the catalyst temperature Tb at the times of the liquid fuel operation and the gas fuel operation. FIG. 2 from the top shows the throttle opening degree Thr, "fuel-increasing amount" which indicates the increasing amount of the fuel injection due to the rise of the upper limit temperature Tb, the presence/absence of the fuel cut, "engine speed Ne" which indicates the rotational speed of the engine 1, "unburned fuel" which indicates the quantity of the unburned fuel remaining in the intake port and/or the cylinders, and the catalyst temperature Tb. In FIG. 2, each of the graphs "B1" to "B4" shows the time variation of each component in common between the liquid fuel operation and the gas fuel operation. The graph "B5" shows the time variation of unburned fuel at the liquid fuel operation. The graph "B6" shows the time variation of unburned fuel at the gas fuel operation. The graph "B7" shows the time variation of the Tb at the liquid fuel operation, and the graph "B8" shows the time variation of the Tb at the gas fuel operation.

First, at the time "t1", the throttle opening degree rises due to the operation of the accelerator by the driver (see graph B1). Thereby, the engine 1 becomes a high-load condition, and the catalyst temperature Tb rises in response to the rise of the exhaust gas temperature in both cases of the liquid fuel operation and the gas fuel operation (see graphs B7 and B8).

At the time "t2" after the time t1, the ECU 50 raises the fuel increasing in response to the rise of the catalyst temperature Tb (see the graph B2). Thereby, the ECU 50 increases the latent heat of vaporization of the fuel to lower the exhaust gas temperature. In contrast, after the time t2, the unburned fuel increases in response to the fuel increasing (see graphs B5 and B6). As a result, after the time t2, the unburned fuel at the liquid fuel operation becomes larger than the unburned fuel at the gas fuel operation. Namely, the unburned fuel at the gas fuel operation is smaller than the unburned fuel at the liquid fuel operation because the gas fuel never adheres to the intake port or the inside of the combustion chamber.

Next, at the time "t3" after the time t2, the throttle opening degree Thr descends (see graph B1). In response, the ECU 50 executes the decelerating operation to start the fuel cut (see graph B3). In case of the liquid fuel operation, the unburned fuel is discharged in large amounts at the time of the fuel cut, thereby to prompt the oxidation reaction of the catalyst 10. Namely, in this case, the catalyst 10 is under the condition of high temperature and oxidant atmosphere (see the graph B7). As a result, sintering of the noble metals in the catalyst 10 occurs, and the performance could deteriorate.

In contrast, in case of the gas fuel operation, the unburned fuel at the time t3, when the fuel cut is executed, is smaller than the unburned fuel at the liquid fuel operation (see the graphs B5 and B6). Therefore, in case of the gas fuel operation, even when the fuel cut is executed, the rise of the catalyst temperature Tb and the deterioration of the catalyst 10 due to the discharge of the unburned fuel are suppressed, and the catalyst temperature Tb declines earlier in comparison to the liquid fuel operation (see the graphs B7 and B8).

As described above, when the ECU 50 executes the liquid fuel operation at the time of the high temperature of the catalyst and the fuel increasing, a large amount of the unburned fuel remains in the engine 1. As a result, there is a possibility that the rise of the catalyst temperature Tb and the deterioration of the catalyst 10 are prompted. In consideration of these facts, when the catalyst temperature Tb is higher than the upper limit temperature Tbth, the ECU 50 increases the fuel injection quantity to make the air fuel ratio rich, and switches from the liquid fuel operation to the gas fuel operation. Thereby, the ECU 50 can suppress the adhesion of the fuel to the intake port and/or the insides of the cylinders 11 and also suppress the deterioration of the catalyst 10 while lowering the catalyst temperature Tb.

(Second Control)

In the second control, besides the first control, after the ECU 50 switches from the liquid fuel operation to the gas fuel operation based on the first control, the ECU 50 sets the timing of re-switching to the liquid fuel operation to the timing of the return from the fuel cut.

The concrete description thereof will be given below. First, when the catalyst temperature Tb at the liquid fuel operation is higher than the upper limit temperature Tbth, the ECU 50 executes the fuel increasing and switches to the gas fuel operation on the basis of the first control. After that, the ECU 50 continues the gas fuel operation until the return from the fuel cut. Then, the ECU 50 starts the fuel cut at the time of the deceleration, and at the time of the return thereof, it switches from the gas fuel operation to the liquid fuel operation. Thereby, at the time of switching the fuel, the ECU 50 can eliminate the influence due to the previously-used fuel remaining, by scavenging the inside of the combustion chamber by using air.

Preferably, at the time of the return from the fuel cut, the ECU 50 initially injects the liquid fuel to the cylinder 11 which executes the combustion stroke following the last cylinder 11 combusted by the gas fuel. Thereby, the ECU 50 equally scavenges each of the cylinders 11 by air, and it can certainly eliminate the influence of the previously-used fuel remaining.

(Third Control)

In the third control, instead of the first control and the second control or besides them, the ECU 50 executes the fuel increasing and switches to the gas fuel operation, if the catalyst temperature Tb at the liquid fuel operation is higher than the upper limit temperature Tbth at the time of acceleration and/or shifting gears of the transmission when the ignition timing is retarded. Thereby, the ECU 50 lowers the catalyst temperature Tb while it realizes the low emission.

Figure 3:
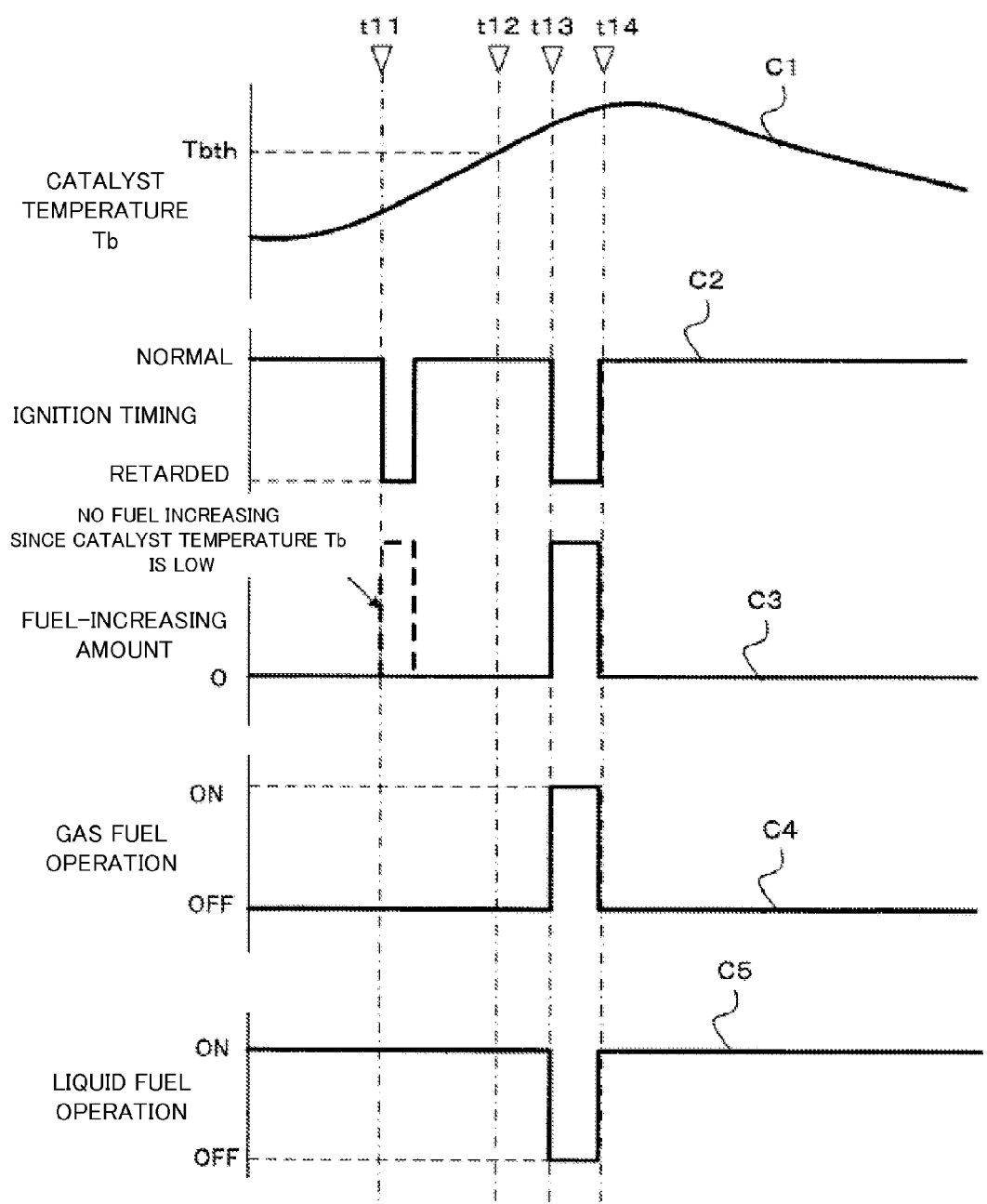
FIG. 3 is one example of the time chart showing the schematic processing in the third control at the time when the vehicle is accelerating.

This will be described below with reference to the time chart shown in FIG. 3. FIG. 3 is one example of the time chart showing the schematic processing in the third control at the time when the vehicle is accelerating. From the top, FIG. 3 shows the catalyst temperature Tb, ignition timing, fuel-increasing amount at the time when the catalyst temperature is high, the presence/absence of the gas fuel operation, the presence/absence of the gas fuel operation, and the presence/absence of the liquid fuel operation. It is assumed that the ECU 50 executes the liquid fuel operation at the start of the time chart.

First, at the time "t11", the ECU 50 retards the ignition timing for a constant time in response to shifting gears of the transmission (see graph C2). In this case, however, the ECU 50 determines that the catalyst temperature Tb does not need to be lowered because the catalyst temperature Tb is equal to or lower than the upper limit temperature Tbth, and it does not execute the fuel increasing (see graph C3).

Next, at the time "t12", the catalyst temperature Tb exceeds the upper limit temperature Tbth due to the rise of the exhaust gas temperature of the engine 1 (see the graph C1). At the time "t13" after the time t12, the ECU 50 makes the ignition timing retarded again in response to shifting gears of the transmission (see the graph C2). At that time, since the catalyst temperature Tb has already been higher than the upper limit temperature Tbth at the time t12, the ECU 50 executes the fuel increasing in addition to retarding the ignition timing (see the graph C3), and switches from the liquid fuel operation to the gas fuel operation (see the graphs C4 and C5). As described above, by switching to the gas fuel operation at the time of the fuel increasing, the ECU 50 can lower the packing efficiency and the intake air amount to lower the exhaust gas temperature effectively.

At the time "t14" when the ignition timing is returned to normal, the ECU 50 stops the fuel increasing and switches from the gas fuel operation to the liquid fuel operation (see the graphs C3 to C5). In this way, by executing the gas fuel operation in case of the operating range where the air fuel ratio becomes rich by the fuel increasing, the ECU 50 can realize the low emission.

[Process Flow]

Next, a procedure of the process according to the embodiment will be described below. In the following description, after the process flow in which the first control and the second control are executed at the same time is described at first with reference to FIG. 4, the process flow in which the third control is executed is described with reference to FIG. 5.

(First Control and Second Control)

Figure 4:
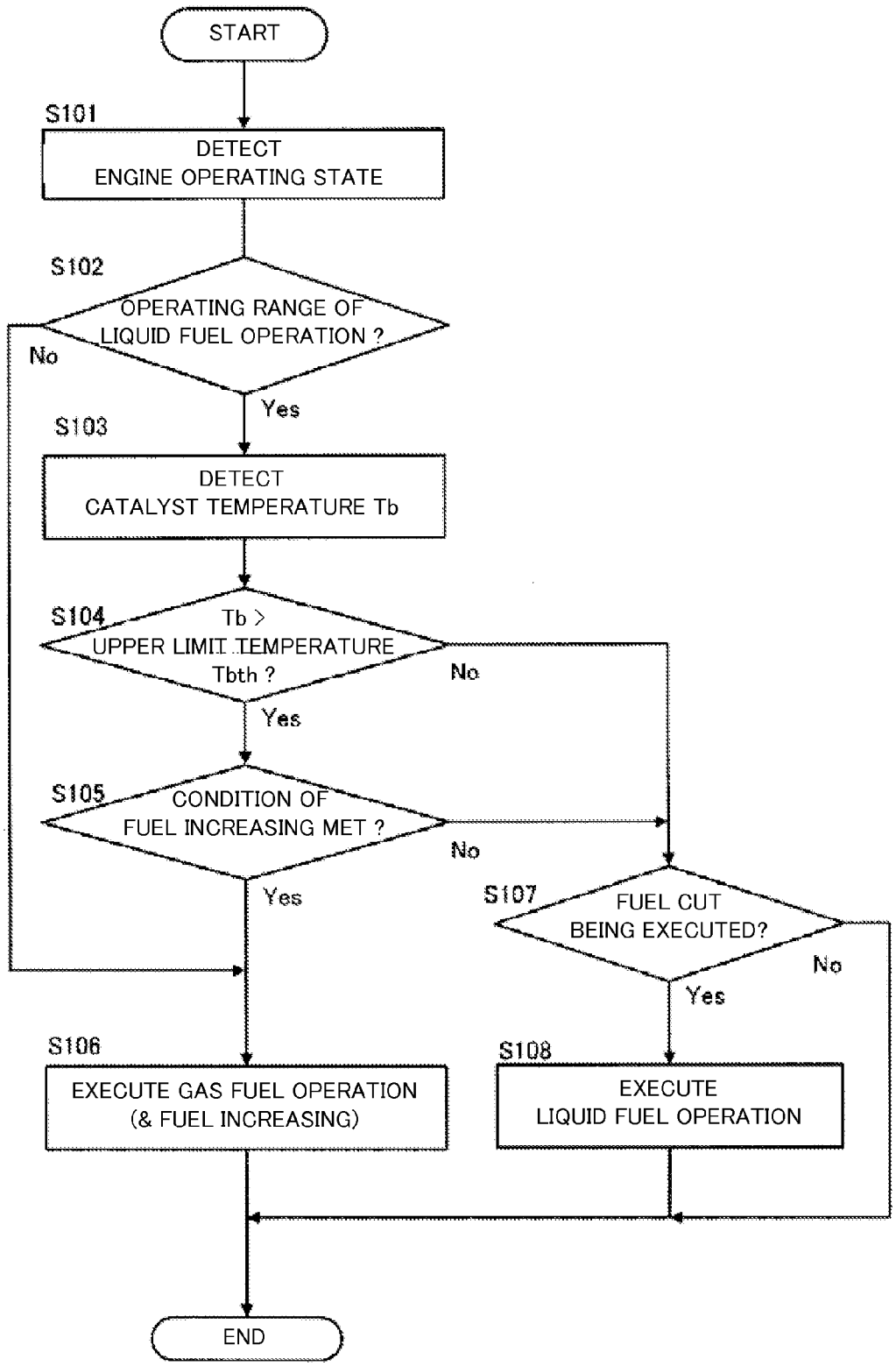
FIG. 4 is an example of a flowchart showing a procedure of the process in which the first control and the second control are executed at the same time.

FIG. 4 is an example of a flow chart showing the procedure of the process in which the first control and the second control are executed at the same time. The flow chart shown in FIG. 4 is repeatedly executed by the ECU 50 in a predetermined cycle.

First, the ECU 50 detects the operating state of the engine 1 (step S101). Concretely, the ECU 50 detects which one of the liquid fuel or the gas fuel is currently used, whether or not the fuel cut is being executed, and whether or not the fuel increasing in response to the rise of the catalyst temperature Tb is being executed.

Next, the ECU 50 determines whether or not the operating range is the operating range of the liquid fuel operation (step S102). For example, the ECU 50 determines whether or not the operating range is the operating range of the liquid fuel operation on the basis of the current operating state with reference to a map prepared in advance. When the ECU 50 determines that the operating range is the operating range of the liquid fuel operation (step S102; Yes), the process goes to step S103. In contrast, when the ECU 50 determines that the operating range is not the operating range of the liquid fuel operation (step S102; No), i.e., determines that the gas fuel operation should be executed, it executes the gas fuel operation (step S106). At that moment, the ECU 50 may execute the fuel increasing when the condition for executing the fuel increasing is met.

Next, the ECU 50 detects the catalyst temperature Tb (step S103). Concretely, the ECU 50 may estimate the catalyst temperature Tb based on the load and the rotational speed of the engine 1, or may detect the catalyst temperature Tb based on the detection value of the temperature sensor provided on the catalyst 10.

Then, the ECU 50 determines whether or not the catalyst temperature Tb is higher than the upper limit temperature Tbth (step S104). Here, the upper limit temperature Tbth is set, by experimental trials in advance, to an upper limit of the upper limit temperature Tb at which the deterioration of the catalyst 10 is not likely to occur. When the ECU 50 determines that the catalyst temperature Tb is higher than the upper limit temperature Tbth (step S104; Yes), the process goes to step S105. In contrast, when the ECU 50 determines that the catalyst temperature Tb is equal to or lower than the upper limit temperature Tbth (step S104; No), it determines that it does not have to execute the fuel increasing and switch to the gas fuel operation in order to lower the catalyst temperature Tb, and the process goes to step S107.

Next, the ECU 50 determines whether or not condition of the fuel increasing is met (step S105). Concretely, if there are some conditions for executing the fuel increasing other than the upper limit temperature Tb, the ECU 50 determines whether or not these conditions are met.

When the ECU 50 determines that the condition of the fuel increasing is met (step S105; Yes), it executes the fuel increasing by the gas fuel operation (step S106). Namely, the ECU 50 executes the fuel increasing and switches from the liquid fuel operation to the gas fuel operation. Thereby, the ECU 50 prevents the unburned fuel from remaining in the intake port or in the cylinder due to the fuel increasing thereby to suppress the deterioration of the catalyst 10 and the rise of the catalyst temperature Tb at the time of the fuel cut, and it also lowers the packing efficiency and the intake air amount thereby to lower the exhaust gas temperature and the catalyst temperature Tb. In contrast, when the ECU 50 determines that the condition of the fuel increasing is not met (step S105; No), the process goes to step S107.

Next, the process after step S107 will be described below. When the catalyst temperature Tb is equal to or lower than the upper limit temperature Tbth (step S104; No), or when the condition of the fuel increasing is not met (step S105; No), the ECU 50 determines whether or not the fuel cut is being executed (step S107). When the fuel cut is being executed (step S107; Yes), the ECU 50 executes the liquid fuel operation (step S108). For example, after the ECU 50 switches from the liquid fuel operation to the gas fuel operation at step S106, it executes the flow chart again. Then, the ECU 50 executes the liquid fuel operation after the execution of the fuel cut if the operating range is the operating range of the liquid fuel operation (step S102; Yes) and the catalyst temperature Tb is equal to or lower than the upper limit temperature Tbth (step S104; Yes). Thereby, the ECU 50 can scavenge the combustion chamber in each of the cylinders 11, and can eliminate the influence caused by the previously-used fuel remaining in the cylinders.

In contrast, when the ECU 50 determines that the fuel cut is not being executed (step S107; No), the process end.

(Third Control)

Figure 5:
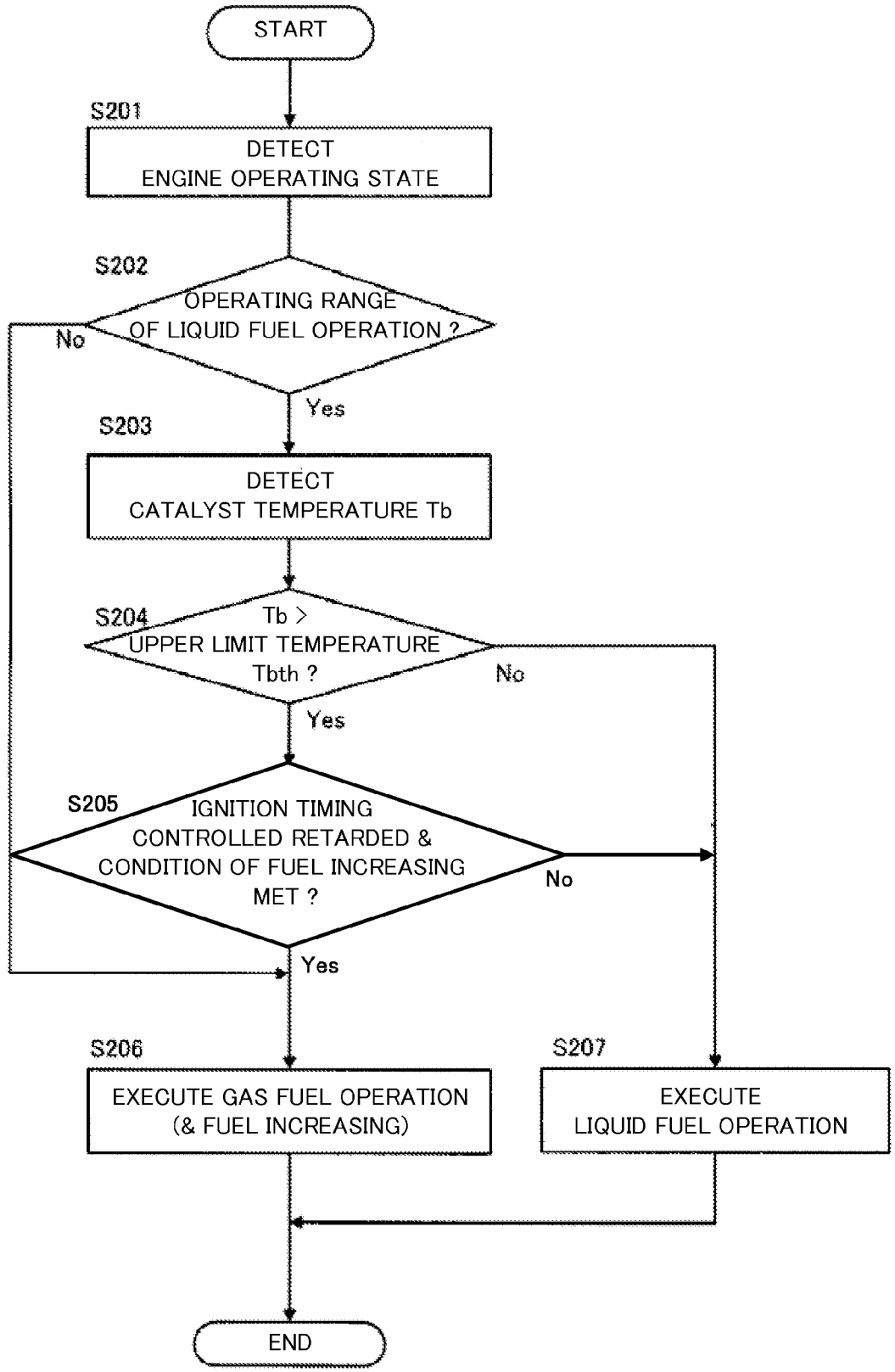
FIG. 5 is one example of a flowchart showing a procedure of the process according to the third control.

FIG. 5 is one example of a flowchart showing a procedure of the process according to the third control. The ECU 50 repeatedly executes the process shown in FIG. 5 in a predetermined cycle, for example.

First, the ECU 50 detects the operating state of the engine 1 (step S201). Next, the ECU 50 determines whether or not the operating range is the operating range of the liquid fuel operation (step S202). When the ECU 50 determines that the operating range is the operating range of the liquid fuel operation (step S202; Yes), the process goes to step S203. In contrast, when the ECU 50 determines that the operating range is not the operating range of the liquid fuel operation (step S202; No), i.e., determines that the operating range is the operating range of the gas fuel operation, it executes the gas fuel operation (step S206). At that moment, the ECU 50 may execute the fuel increasing when the condition for executing the fuel increasing is met.

Next, the ECU 50 detects the catalyst temperature Tb (step S203). Then, the ECU 50 determines whether or not the catalyst temperature Tb is higher than the upper limit temperature Tbth (step S204). When the ECU 50 determines that the catalyst temperature Tb is higher than the upper limit temperature Tbth (step S204; Yes), the process goes to step S205. In contrast, when the ECU 50 determines that the catalyst temperature Tb is equal to or lower than the upper limit temperature Tbth (step S204; No), it executes the liquid fuel operation (step S207). In this case, the ECU 50 does not execute the fuel increasing due to the rise of the catalyst temperature Tb.

Next, the ECU 50 determines whether or not the ignition timing is controlled to be retarded and the condition of the fuel increasing is met (step S205). Concretely, the ECU 50 determines whether or not the ignition timing is retarded for the reason that acceleration or shifting gears of the transmission is being executed, and whether or not the condition of the fuel increasing is met. When the ECU 50 determines that the ignition timing is controlled to be retarded and the condition of the fuel increasing is met (step S205; Yes), it executes the fuel increasing by the gas fuel operation (step S206). In other words, the ECU 50 executes the fuel increasing while retarding the ignition timing and also switches from the liquid fuel operation to the gas fuel operation. Thereby, the ECU 50 realizes the low emission while executing the fuel increasing, and lowers the intake air amount and the packing efficiency thereby to lower the exhaust gas temperature.

In contrast, when the ECU 50 determines that the ignition timing is not controlled to be retarded or the condition of the fuel increasing is not met (step S205; No), it executes the liquid fuel operation (step S207).

[Modification]

In the explanations of the first control to the third control, the ECU 50 switches from the liquid fuel operation to the gas fuel operation when the catalyst temperature Tb is higher than the upper limit temperature Tbth and the predetermined condition is met. However, the method to which the present invention is applied is not limited to this method.

Instead of this, the ECU 50 may increase the use proportion of the gas fuel to the fuel used for the combustion of the engine 1 when the catalyst temperature Tb is higher than the upper limit temperature Tbth and the predetermined condition is met. Namely, in this case, the ECU 50 may increase the proportion of the gas-fuel use while continuing to use the liquid fuel. Thereby, while suppressing the increase of the unburned fuel at the time of the fuel increasing, the ECU 50 can lower the packing efficiency and the intake air amount thereby to lower the exhaust gas temperature, similarly to the above-mentioned embodiment.

The concrete description thereof will be given with reference to the flowcharts in FIGS. 4 and 5. For example, in FIG. 4, when the condition of the fuel increasing is met (step S105; Yes), the ECU 50 executes the fuel increasing and increases the proportion of the gas fuel to the fuel used for combustion of the engine 1. Besides, after the execution of the step S106, the ECU 50 re-executes the process of the flowchart, and returns the proportion of the gas-fuel use to its original value when it determines that the fuel cut is being executed (step S107; Yes). Similarly, in FIG. 5, when the ignition timing is controlled to be retarded and the condition of the fuel increasing is met (step S205; Yes), the ECU 50 executes the fuel increasing and increases the use proportion of the gas fuel to the fuel used for the combustion of the engine 1.

BRIEF DESCRIPTION OF THE REFERENCE NUMBER

1 Engine
2 First fuel injection valve
3 Second fuel injection valve
4 Surge tank
5 Throttle valve
6 Intake passage
7 Air cleaner
8 Exhaust passage
10 Catalyst
50 ECU
100 Fuel injection system

The invention claimed is:

1. A control device for an internal combustion engine which is configured to use gas fuel and liquid fuel as a fuel source, the gas fuel and the liquid fuel provided to the internal combustion engine via a gas fuel injection valve and a liquid fuel injection valve, comprising:
   a catalyst which cleans up exhaust gas of the internal combustion engine; and
   an electronic control unit programmed to control the gas fuel injection valve and the liquid fuel injection value to increase a proportion of the gas fuel to the liquid fuel while increasing a fuel injection quantity when a temperature of the catalyst is higher than a predetermined upper limit valve at a time when the liquid fuel is used for the internal combustion engine,
   wherein the electronic control unit is programmed to control the gas fuel injection valve and the liquid fuel injection valve to return the proportion of the gas fuel to the liquid fuel at a time of a return from a fuel cut.

2. A control device for an internal combustion engine of a vehicle which is configured to use gas fuel and liquid fuel as a fuel source, the gas fuel and the liquid fuel provided to the internal combustion engine via a gas fuel injection valve and a liquid fuel injection valve, comprising:
   a catalyst which cleans up exhaust gas of the internal combustion engine; and
   an electronic control unit programmed to control the gas fuel injection valve and the liquid fuel injection valve to increase a proportion of the gas fuel to the liquid fuel while increasing a fuel injection quantity when a temperature of the catalyst is higher than a predetermined upper limit value at a time when the liquid fuel is used for the internal combustion engine,
   wherein the electronic control unit is programmed to control the gas fuel injection valve and the liquid fuel injection valve to increase the proportion while increasing the fuel injection quantity at a time of acceleration and/or at a time of shifting gears of a transmission of the vehicle.

* * * * *